Figure 1:
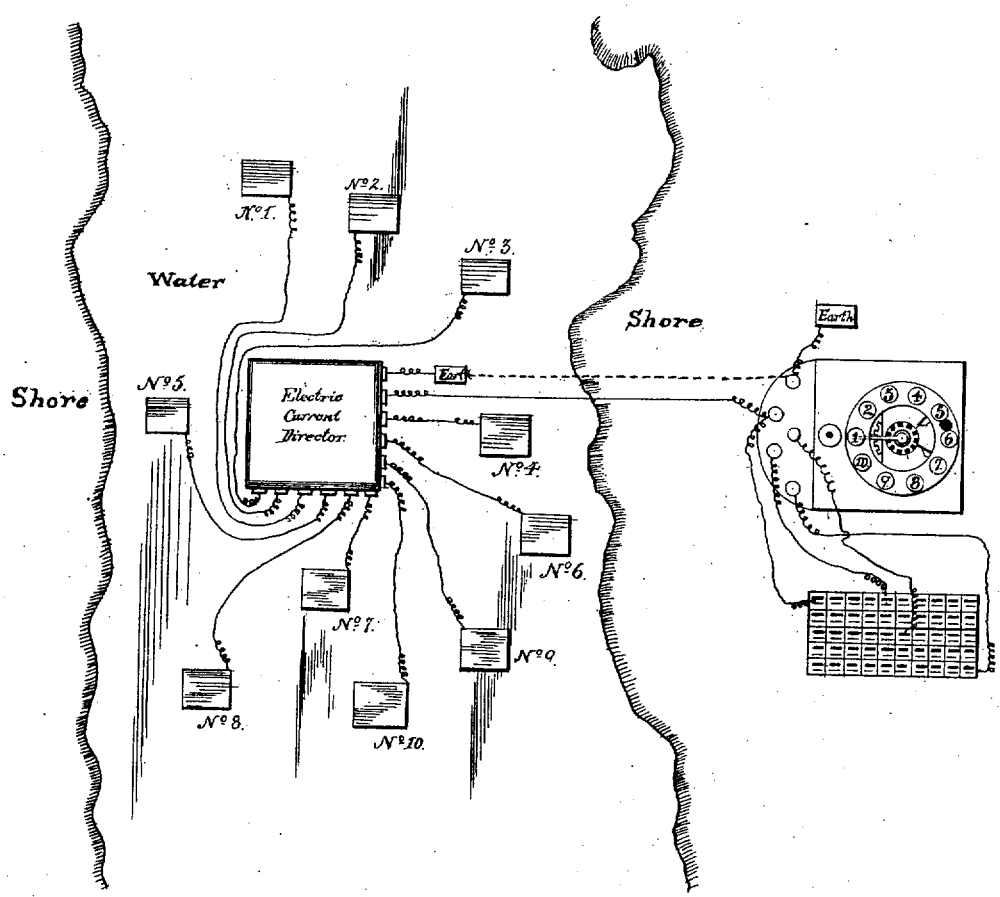

(No Model.)

G. E. HAIGHT.
ELECTRICAL DEVICE FOR OPERATING SUBMERGED MINES, &c.

No. 257,695. Patented May 9, 1882.

2 Sheets—Sheet 1.

Attest:
A. W. Bright
H. C. Hartmann

Inventor:
George E. Haight
by G. B. Brock
Atty.

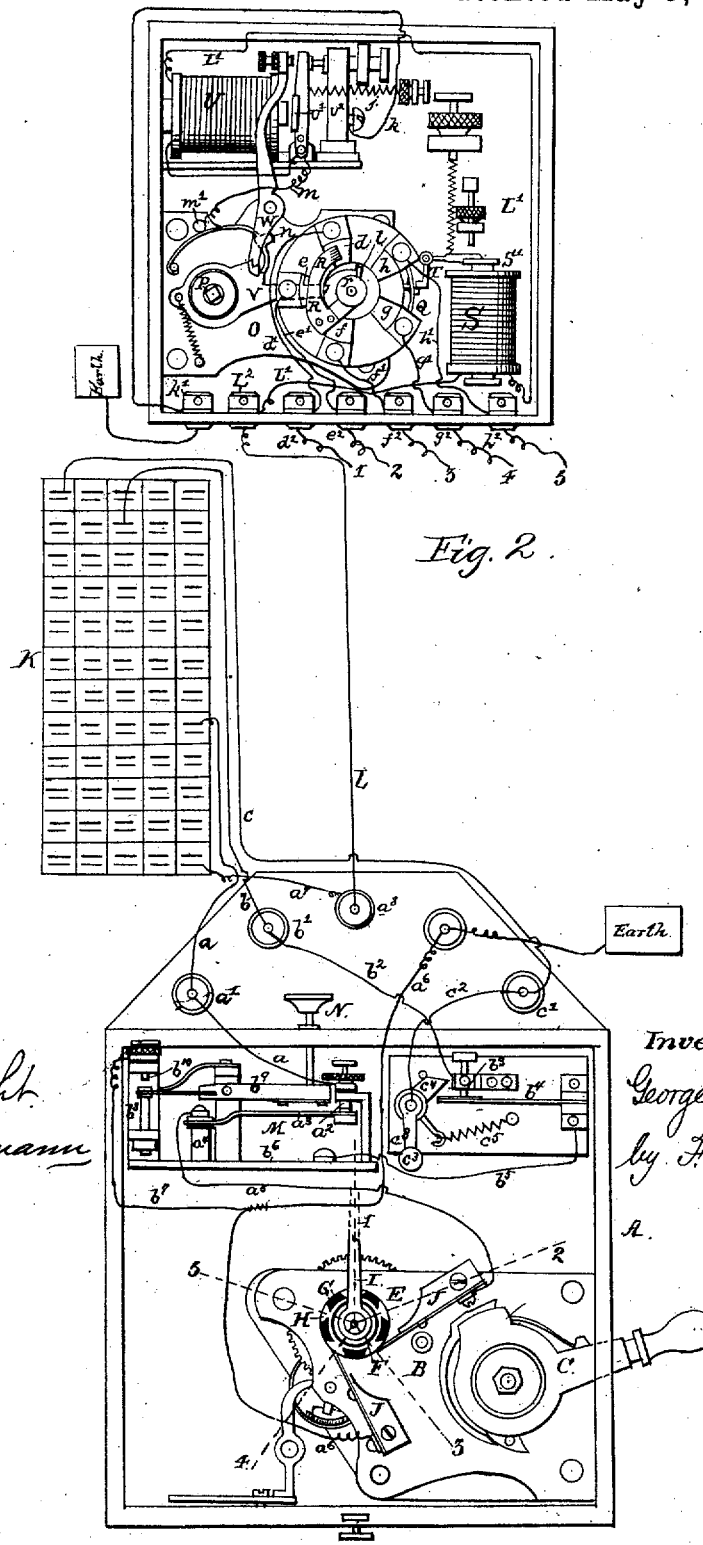

UNITED STATES PATENT OFFICE.

GEORGE E. HAIGHT, OF HARTFORD, CONNECTICUT, ASSIGNOR OF ONE-HALF TO HARVEY D. WINSOR, OF NEW YORK, N. Y.

ELECTRICAL DEVICE FOR OPERATING SUBMERGED MINES, &c.

SPECIFICATION forming part of Letters Patent No. 257,695, dated May 9, 1882.

Application filed September 7, 1881. (No model.)

*To all whom it may concern:*

Be it known that I, GEORGE E. HAIGHT, a citizen of the United States, residing at Hartford, in the county of Hartford and State of Connecticut, have invented certain new and useful Improvements in Electrical Devices for Operating Stationary Submerged Mines or Torpedoes; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My present improvement relates to stationary submerged torpedoes and methods of firing the same.

My invention therefore consists in a submerged current-selector or transmitter in electrical connection with a series of fixed submerged mines or torpedoes, and also in connection with an operating key-board on shore or other desirable directing-point by a single wire, the whole being so constructed and arranged that each and every one of the series of fixed mines may be first brought into unison with the main line and battery through the current-director or transmitter by a comparatively feeble current, which normally flows through the line, and then actuated by an increase of said battery-current.

It further consists in the employment of a battery-current sufficiently strong to throw into unison the different circuits leading to the series of fixed submerged mines through suitable apparatus at each end of the line, but not strong enough to actuate said mechanisms, the current passing out through a shorter circuit of less resistance; and, also, in the employment of a stronger current sufficient to unlock the unison stop when locked; and, finally, in the employment of a still stronger current sufficient to instantaneously explode the torpedo or mine then in electrical unison or connection.

Figure 1 of the drawings shows a diagram view of the arrangement of my improved devices, the fixed mines and current-director being here shown submerged in a navigable water-course and the key-board and battery on shore. Fig. 2 illustrates by diagram view the arrangement of the key-board and current-director apparatuses and the manner of connecting the battery.

The construction and arrangement of the current-director and key-board have been fully described in a separate pending application made by me for devices for controlling the operations of self-propelled torpedo-boats, and therefore it is necessary only to briefly refer to these devices.

A represents the key-board apparatus, and is placed at any suitable directing-point within an inclosing-box.

B is a clock mechanism driven by a suitable spring wound by the ratchet-lever C.

E is a circuit making and breaking wheel or piece mounted upon an arbor of the mechanism B, from which it is insulated.

G G are insertions of insulating material, between which the conducting material comes, thus presenting a segment of conducting and a segment of insulating material of equal extent.

I is a needle arranged upon the same arbor which carries wheel E, and arranged to be arrested by a series of stops which lie along the dotted line 1 2 3 4 5.

J J are metallic springs within the main circuit. They bear against wheel E in such manner that normally said springs rest against the metallic portions thereof, (which are continuous,) and the main-line current flows through the line.

In Fig. 2 the key-board apparatus is arranged for firing five fixed mines of torpedoes, and the current-director in the same figure correspondingly arranged. In Fig. 1, however, the key-board is provided with ten stops and a corresponding number of submerged mines. It is evident that any number of mines may be arranged and operated in this way by a single wire, and I do not therefore confine myself to any definite number.

The current-director consists of the clock mechanism O, driven by a spring or equivalent. This mechanism carries an escapement-wheel, Q, arranged to coact with a vibrating pawl, T, operated by the pulsations of the electric current through an electro-magnet, S, and its armature S'. Upon the same arbor which carries wheel Q is an arm, R, the outer extremity of which is arranged to sweep a series of metallic plates, $d\ e\ f\ g\ h$, &c., each in electrical connection with one of the fixed mines or torpedoes, through wires $d'\ e'\ f'\ g'\ h'$ and binding-posts $d^2\ e^2\ f^2\ g^2\ h^2$. The number of metallic plates and wires leading therefrom is correspondingly modified when a greater or less number of mines or torpedoes are desired.

In Fig. 2 the arm R is shown in contact with plate $d$, leading to mine No. 1, and the needle I is shown lying in the direction of stop No. 1 of the key-board. The normal current, or current from five cells of the battery, flows from the fifth carbon through wire $a$, post $a'$, point $a^2$, spring $a^3$, wire $a^5$, springs J, wheel E, wire $a^6$, to earth, and from the zinc-pole of the first cell it passes, by wire $a^7$, post $a^8$, line wire L, post $L^2$, wire $L'$, electro-magnet S, (whose armature it attracts, and holds the pawl T against one of the stops of wheel Q,) thence by same wire $L'$ to electro-magnet U, thence to armature U', where the current finds one of two routes, according to the intensity of the current, one through wire $m$, post $m'$, frame of train of gears O, arbor $r$, arm R, plate $d$, wire $d'$, post $d^2$, and wire 1, to fixed submerged mine No. 1. The other route is through post $U^2$, wire $k$, and post $k'$ to ground. Fixed mine No. 1 is therefore in electrical connection with the weaker normal current flowing over the line-wire; but as this normal current is not of sufficient intensity to actuate the armature U' of the electro-magnet U against its retractile spring $j$ the current accordingly finds its way out through post $U^2$, wire $k$, and post $k'$, as before described, it being the route of least resistance. When it is desired to explode this mine the button N is pressed down and the switch $c^3$ operated. These two operations will have the effect of first breaking the connection with the fifth carbon of the battery by button N depressing switch-lever $b^9$, and, secondly, by lever $c^3$ making contact with spring $b^4$, (the thirty-fifth carbon wire being broken through point $b^3$,) whereby the current flows through wire $b^5$, frame $b^6$, trunnion-posts and trunnion to lever $b^9$, (which was previously held down,) where the current finds two routes, as before explained, the current from the zinc-pole finding a route through main line L. It will be thus seen that a current from sixty cells of the battery is made to flow through the line and the mine instantaneously exploded by the strong current flowing through the usual resistance-coils of the torpedo-mine. This it does by the stronger current attracting armature U' against its retractile spring, thereby shutting out the short circuit through wire $k$ and compelling the current to pass through wire $m$, post $m'$, frame O of clock-work, arm R, plate $d$, wire $d'$, post $d^2$, and wire 1 to mine No. 1.

The unison device for the current-selector, consisting of lever W, operated by electro-magnet U and lever V, pin $l$, and pawl $n$, may be employed, and is fully described in the separate application before referred to; or it may be dispensed with, if desired.

I do not confine myself to the means for throwing in the differing currents from the battery; nor do I limit my invention to the employment of a battery-current of three differing intensities in connection therewith. It is obvious that a comparatively feeble current may be used to first select the desired torpedo or mine and place it in electrical connection with the battery, so as to be instantly exploded by any material increase of the battery-power through any suitably-devised apparatus.

When a unison device is used, the purpose of which is to insure the key-board apparatus being in unison with the current-selector, the button N is used, which, being pressed down in the manner referred to, causes a current greater than the normal current and less than the current used to explode the mine to flow through the line and perform its work in the manner set forth in the pending application referred to.

This invention is particularly designed for manipulating fixed submerged mines, and admits of firing any one of series independent of the others by means of a single key-board at a distant point, (as on shore or on shipboard,) and by means also of a single wire leading from said point to the current-selector. The current-selector is likewise submerged and preferably arranged at a point central between the mines. It is inclosed in a water-tight compartment. When the key-board is placed on shipboard the wire is suitably arranged upon a reel and is paid out according to the movements of the vessel.

What I claim is—

A series of fixed submerged mines or torpedoes, each having a wire leading to a submerged current-selector, said current-selector being in electrical connection through a single wire with a key-board apparatus and battery located at a distant point on shore or shipboard, the whole constructed to act in combination, in the manner and for the purposes set forth.

In testimony whereof I affix my signature in presence of two witnesses.

GEORGE E. HAIGHT.

Witnesses:
IRA B. SMITH,
THOMAS McMANUS.